United States Patent Office

3,630,855
Patented Dec. 28, 1971

3,630,855
PROCESS FOR REMOVING NAPHTHALENE FROM PHENOL BY EXTRACTIVE DISTILLATION
Kenneth L. Turbin, Midland, Mich., assignor to The Dow Chemical Company, Midland, Mich.
No Drawing. Filed May 4, 1970, Ser. No. 34,528
Int. Cl. B01d *3/40;* C07c *39/04*
U.S. Cl. 203—63                      9 Claims

ABSTRACT OF THE DISCLOSURE

Naphthalene is removed from phenol by extractive distillation in the presence of a polyphenyl or polyphenyl ether.

BACKGROUND OF THE INVENTION

Naphthalene has been removed from phenol by crystallization. French Patent 965,438 (1950) teaches the separation of phenol and naphthalene by adding an alcohol to the mixture, then crystallizing and separating the naphthalene. Phenol is obtained by removing the alcohol. This process is not easily adapted to a commercial process.

An alternative method of separation has been the addition of aqueous caustic to the mixture to form the alkali metal phenate and then separating the organic layer containing naphthalene from the aqueous layer containing the phenate. The phenol is then removed by acidification. This process consumes large quantities of acid and base and therefore is undesirable on a commercial scale.

SUMMARY OF THE INVENTION

It has now been discovered that minor amounts of naphthalene in phenol may be separated conveniently by extractive distillation in the presence of a polyphenyl, polyphenyl ether or mixture thereof having no more than 4 aromatic nuclei.

The novel feature of the present invention is the fractional distillation of a mixture of phenol and naphthalene in the presence of a polyphenyl or polyphenyl ether. Such polyphenyls and polyphenyl ethers include any such compound containing up to 4 aromatic nuclei, with those containing up to 3 aromatic nuclei being preferred. Also preferred are unsubstituted polyphenyls and polyphenyls containing phenoxy and/or hydroxy substituents, and unsubstituted polyphenyl ethers and polyphenyl ethers containing phenyl and/or hydroxy substituents. The positions of the substituents are of little or no importance.

Representative examples of polyphenyls and polyphenyl ethers include: polyphenyls, such as biphenyl, terphenyl and quaterphenyl; substituted polyphenyls, such as o- and p - phenylphenol, chlorobiphenyl, diphenoxybiphenyls, mono- and dihydroxyterphenyls and dihydroxybiphenyls; polyphenyl ethers, such as phenyl ether, diphenoxybenzenes and diphenoxydiphenyl ethers; and substituted phenyl ethers, such as biphenylyl phenyl ethers, chlorobiphenyl ethers, mono- and dihydroxyphenyl ethers and biphenylyl biphenylyl ethers. Of these compounds, phenyl ether, biphenyl, phenoxydiphenyl ethers, diphenoxydiphenyl ethers and biphenylyl phenyl ethers are especially preferred, with biphenylyl phenyl ethers being of special interest.

The extractive distillation of the invention is conveniently conducted in a continuous distillation column although a batch distillation may also employ the invention. In such column the phenol feed is distilled, and the polyphenyl or polyphenyl ether is fed against the flow of the vaporized phenol. Generally, the flow of the polyphenyl or polyphenyl ether is about 1 to about 6 volumes per volume of the liquid phenol flow.

In the operation of the column at least some of the overhead condensate is preferably refluxed to the column. The reflux ratios may vary widely but ratios of about 0.2 to about 10 are generally preferred.

During the extractive distillation, naphthalene is removed from the phenol and dissolved in the polyphenyl or polyphenyl ether. The naphthalene may be easily separated from this solution by conventional means, and the phenyl aromatics may be recycled to the extractive distillation.

Although the content of naphthalene may be any minor amount, phenol containing only small amounts of naphthalene are preferably employed. Such preferred mixtures usually contain less than about 10% by weight of naphthalene, with naphthalene concentrations of less than about 2% being especially preferred.

SPECIFIC EMBODIMENT

A vertical continuous distillation column made of 2" glass tube and containing 37 plates was constructed. Phenol containing 4,000 p.p.m. of naphthalene was distilled by introducing the mixture at the 17th plate from the bottom. In the comparative test, the mixture was distilled without the addition of an extraction agent. In the tests showing the invention biphenylyl phenyl ether containing by weight 86.1% o-biphenylyl phenyl ether, 5.5% p-biphenylyl phenyl ether and a remainder of phenylphenols, diphenylphenols and unidentified compounds from the caustic hydrolysis of chlorobenzene, was fed into the column at the 31st plate. The distillation column was operated at a head pressure of 30 mm. Hg absolute and a head temperature of about 90° C. The results are noted in Table I.

TABLE I.—EXTRACTIVE DISTILLATION OF PHENOL CONTAINING NAPHTHALENE

| Sample | Phenol feed, ml./hr. | Biphenyl phenyl ether feed, ml./hr. | Reflux ratio | Naphthalene in distillate, p.p.m. |
|---|---|---|---|---|
| Composition A | 240 | 0 | 20:1 | 3,500 |
| 1 | 280 | 1,100 | 10:1 | 500 |
| 2 | 220 | 900 | 5:1 | 165 |
| 3 | 280 | 900 | 1:1 | 222 |
| 4 | 360 | 950 | 1:1 | 400 |
| 5 | 220 | 1,400 | 0.6:1 | 67 |
| 6 | 240 | 1,500 | 0.6:1 | 56 |
| 7 | 360 | 1,450 | 0.6:1 | 137 |
| 8 | 350 | 1,450 | 0.6:1 | 78 |

Also, in the same manner as shown by the example above the biphenylyl phenyl ether could be replaced by other polyphenyls and polyphenyl ethers, such as phenylphenols, biphenyl, phenyl ether, chlorobiphenyl, phenoxy diphenyl ether, diphenoxy diphenyl ether and diphenyl phenol, to give similar removal of naphthalene from phenol.

I claim:
1. The process for separating naphthalene from phenol comprising fractionally distilling phenol containing a minor amount of naphthalene in the presence of a polyphenyl, a polyphenyl ether or mixture thereof having not more than 4 aromatic nuclei.

2. The process of claim 1 wherein the polyphenyl or polyphenyl ether has no more than 3 aromatic nuclei.

3. The process of claim 1 wherein the polyphenyl is unsubstituted, or contains phenoxy and/or hydroxy substituents.

4. The process of claim 1 wherein the polyphenyl ether is unsubstituted, or contains phenyl and/or hydroxy substituents.

5. The process of claim 1 wherein the distillation is conducted in the presence of phenyl ether, biphenyl, diphenoxybenzene, diphenoxydiphenyl ether or biphenylyl phenyl ether.

6. The process of claim 1 wherein the distillation is conducted in the presence of biphenylyl phenyl ether.

7. The process of claim 1 wherein the process is conducted in a continuous distillation column.

8. The process of claim 7 wherein the feed rate of the polyphenyl or polyphenyl ether is about 1 to about 6 times that of the mixture of phenol and naphthalene.

9. The process of claim 7 wherein the column is operated at a reflux ratio of about 0.2 to about 10.

References Cited

UNITED STATES PATENTS

| | | | |
|---|---|---|---|
| 2,575,285 | 11/1951 | Carlson et al. | 203—63 |
| 2,862,857 | 12/1958 | Filar | 203—67 |
| 2,890,254 | 6/1959 | Detrick et al. | 260—674 N |
| 3,184,398 | 5/1965 | Schumacher et al. | 260—621 A |

WILBUR L. BASCOMB, JR., Primary Examiner

U.S. Cl. X.R.

203—64, 67, 69; 260—621 A, 674 N